Feb. 28, 1939.  W. F. ERRIG ET AL  2,149,010
APPARATUS FOR MAKING INCISIONS
Filed Feb. 11, 1937
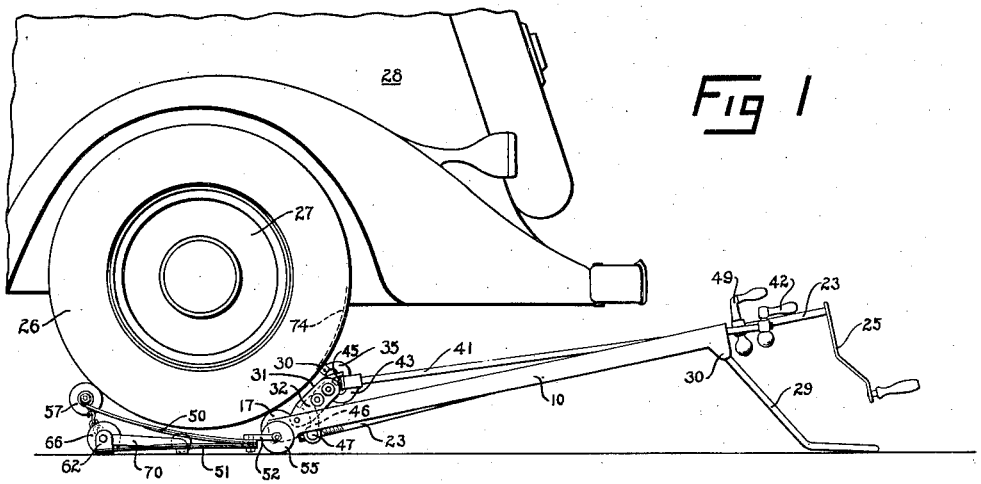
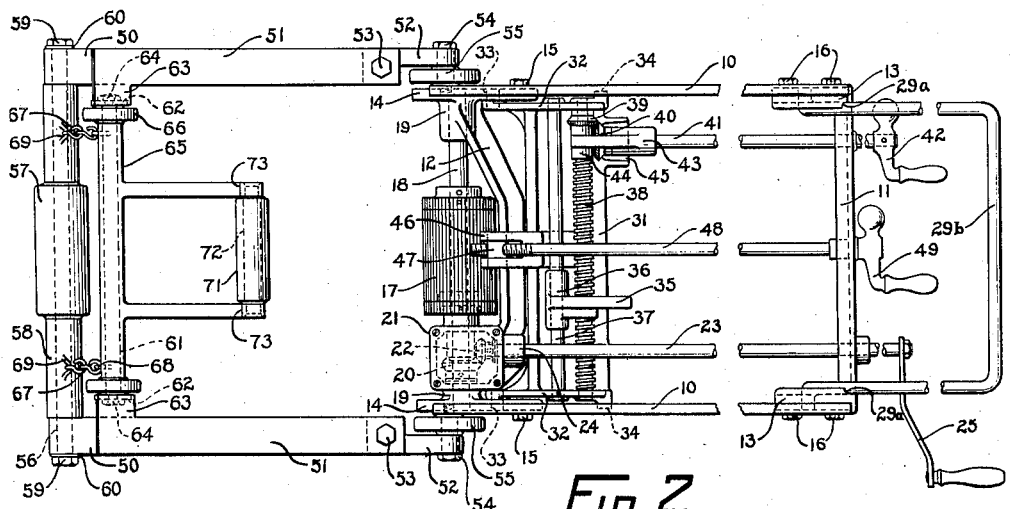
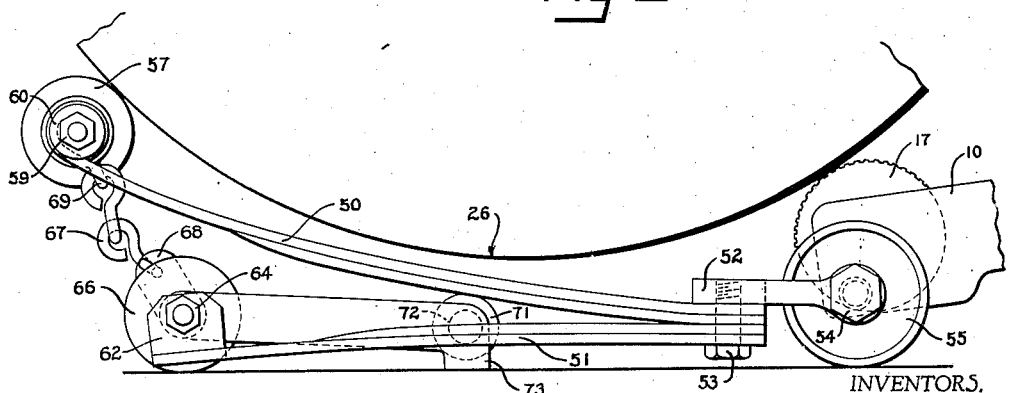
INVENTORS.
William F. Errig
Edward S. De Hart
BY F. Bascom Smith
ATTORNEY.

Patented Feb. 28, 1939

2,149,010

UNITED STATES PATENT OFFICE 2,149,010

APPARATUS FOR MAKING INCISIONS

William F. Errig, Philadelphia, Pa., and Edward S. De Hart, Collingswood, N. J., assignors to Peco Manufacturing Corporation, Philadelphia, Pa., a corporation of Pennsylvania Application February 11, 1937, Serial No. 125,210

14 Claims. (Cl. 82—4)

This invention relates to milling or planing mechanisms and more particularly to apparatus adapted for use in treating vehicle tires or like articles, such as by making incisions in the surfaces thereof.

It has been heretofore proposed to provide apparatus and more particularly portable apparatus adapted for use in cutting incisions in the surface of a vehicle tire without removing the tire or the wheel on which the same is mounted from the vehicle and, although some of the devices heretofore proposed have proved quite satisfactory, none of them have given complete satisfaction. For example, it is extremely difficult, when using some of the prior devices, to hold the same in the proper and desired position relative to the tire or other article being treated. With most prior devices wherein the tire is rotated manually during the treating operation, an undue amount of effort is required to effect such rotation and none of the prior devices are so constructed as to permit of the satisfactory use of the vehicle motor as a prime mover for effecting such rotation. Other devices are designed to support the entire weight or at least one-quarter of the weight of the vehicle, thereby rendering manual operation substantially impossible and accordingly necessitating the provision of independent power means as well as the provision of a comparatively heavy and expensive construction. Furthermore, none of the devices heretofore provided have been suitable for use in treating tires on large trucks or other vehicles equipped with dual wheels.

It is accordingly one of the objects of the present invention to provide novel means whereby the foregoing difficulties and disadvantages are overcome and obviated.

Another object of the invention is to provide novel apparatus adapted for use in making incisions in rotatably mounted articles, such as in the tires of an automotive vehicle.

Still another object is to provide a novel, readily portable mechanism for cutting incisions in vehicle tires whereby said tires may be treated while being rotatably driven by the power of the vehicle engine.

A further object is to provide novel means for maintaining a cutting blade or like element in a predetermined position relative to a rotatable article which is being cut or treated thereby.

A still further object is to provide a novel, portable tire treating apparatus which is light weight and yet durable, which is simple both in construction and operation, which may be readily and inexpensively manufactured, and which may be operated without the exercise of any special skill.

The above and further objects and novel features of the invention will more fully appear from the following detailed description, when the same is read in connection with the accompanying drawing. It is to be expressly understood, however, that the drawing is for the purpose of illustration only and is not intended as a definition of the limits of the invention, reference being primarily had for this latter purpose to the appended claims.

In the drawing, wherein like reference characters refer to like parts throughout the several views, Fig. 1 is a side elevation of one form of device embodying the present invention, said device being shown in operative position for treating a rear tire of an automobile;

Fig. 2 is a bottom view of said device on an enlarged scale and with parts thereof broken away; and, Fig. 3 is a partial side elevation of said device showing the same in operative position, the same being shown on an even larger scale than in Fig. 2.

A single embodiment of the invention is illustrated in the drawing, by way of example, in the form of a portable apparatus adapted for use in cutting circumferential incisions, such as slits or grooves, in the surface of a vehicle tire without removing the latter from the vehicle. Said device embodies a cutting tool and manual means for moving said cutting tool into position for cutting said incisions together with manual means for rotating the tire during treatment thereof, said means being so constructed and so located as to render it unnecessary for the operative to get underneath the vehicle at any time. Novel means are also provided in combination with the above apparatus for automatically correctly positioning the same relative to the tire to thereby insure the easy manual rotation of the latter and also insure satisfactory operation when the tire is rotated by the power of the vehicle engine.

The illustrative apparatus shown in the drawing comprises a substantially rectangular supporting frame constituted by a pair of elongated channel-shaped members 10 and a pair of cross beams 11 and 12 bridging the adjacent ends of said members. Said beams are preferably provided with end flanges 13 and 14, respectively, which fit into the channels of members 10 and are secured thereto by any suitable means, such as by rivets or bolts 15 and 16. Manually operable means for rotating the tire or other article being subjected to treatment are mounted on frame 10—12, said means, in the form shown, including a toothed or roughened drive roller 17 mounted on a shaft 18 for rotation therewith, said shaft being rotatably supported in a pair of bearings 19, 19 formed integrally with crosspiece 12. A bevel gear 20 is secured to shaft 18 within a small housing 21 which surrounds said shaft and is supported by or formed integrally with frame member 12. Meshing with gear 20 is a bevel gear 22 which is mounted on the end of a rod 23 that is rotatably journalled in a bearing boss 24 formed integrally with housing 21 and in an opening in frame member 11. A crank 25 is secured to the outer end of rod 23 for rotating the latter and, hence, roller 17. The latter is adapted to be held in firm, frictional engagement with a tire 26, which may be mounted on a wheel 27 of an automobile 28 that has been jacked up, by novel means to hereinafter appear so that upon rotation of said roller the tire will also be caused to rotate.

To provide ample space for turning crank 25, a suitable support, such as a U-shaped bail 29 is provided in the outer end of frame 10—12. Said bail or support is pivotally mounted on flanges 13 of member 11, as best seen in Fig. 2, and is adapted to be temporarily held in the inclined position shown in Fig. 1 by grooves 29a formed in the inner surfaces of depending ears 30 provided on said flanges. The operative may place his foot on the laterally extending portion 29b of said bail which rests on the floor to hold the outer end of frame 10—12 against lateral and vertical movement.

Means, such as a cutting tool 30 (Fig. 1), for cutting incisions in tire 26 is supported by frame 10—12 adjacent roller 17 and means are provided for moving said cutting tool both vertically and laterally relative to said frame and tire, whereby the same may be readily positioned to cut said incision. The means for mounting said cutting tool are constituted by a carriage comprising a laterally extending plate 31 having depending end flanges 32, 32 by means of which the same is pivotally supported on pivot pins 33, 33 that project inwardly from flanges 14, 14 of member 12. The pivotal movement of carriage 31, 32 in a clockwise direction, as viewed in Fig. 1, is preferably limited by laterally extending ears 34, 34 which are adapted to engage the upper surfaces of frame members 10, 10.

In order that tool or knife 30 may be laterally adjusted, the same is mounted in any suitable manner on a supporting bracket 35 which is curved to extend below plate 31 and which is provided with a sleeve 36 slidably surrounding a smooth cross bar 37 that is supported by carriage flanges 32, 32. Said bracket is also provided with a threaded opening for receiving a threaded shaft 38 which extends parallel to rod 37 and is rotatably journalled at its ends in flanges 32, 32. Thus, upon rotation of threaded shaft 38, bracket 35 and, hence, knife 30 will be moved laterally across tire 25, the direction of such movement being dependent upon the direction in which said shaft is rotated.

Means are provided whereby shaft 38 may be rotated without requiring the operative to get beneath the vehicle. In the form shown, said means are constituted by a bevel gear 39 which is secured to shaft 38 for rotation therewith and meshes with a bevel gear 40 mounted on the inner end of a rod 41 that extends at right angles to said shaft, the other end of said rod being provided with a counter-balanced crank 42. In order that rod 41 may assume any desired angle relative to a horizontal plane containing the axis of shaft 38 without disturbing the meshing of gears 39 and 40, said rod is journalled in a bearing block 43 which is, in turn, loosely mounted on a smooth portion of said shaft for angular movement relative thereto by means of a sleeve 44 formed integrally with said block. If desired, gear 40 may be partially enclosed by a canopy 45 formed integrally with plate 31.

In order that tool 30 may be vertically adjusted to place the same in a desired position relative to tire 26 for making a circumferential incision therein, means are provided for pivoting carriage 31, 32 about pivots 33. Said means, as shown, comprises a curved arm 46 formed integrally with and depending from plate 31 at the center of the latter. The lower end of said arm is bifurcated and rotatably supports a pin 47 which has a centrally disposed, diametrically extending opening therethrough for threadedly receiving the threaded end of a rod 48. The other end of said rod is rotatably journalled in frame member 11 and fixed against longitudinal movement. A counter-balanced crank 49 is provided for rotating rod 48, whereby pin 47 will be caused to travel axially of said rod and impart angular movement to carriage 31, 32 for moving cutting tool 30 either upwardly and toward or downwardly and away from tire 26, depending upon the direction in which crank 49 is turned.

Heretofore, difficulty has been experienced in maintaining apparatus of the above character in the desired position relative to the tire or other article after the cutting blade has been properly adjusted and it has also been found difficult, even with the exertion of considerable energy, to maintain the drive roller in sufficiently firm, frictional engagement with the tire especially large truck tires which are mounted on heavy dual wheels that are, in turn, connected to heavy differential gearing. Novel means are accordingly provided by this invention whereby the cutting tool will be maintained in the correct adjusted position relative to the tire and whereby a firm driving engagement between the drive roller and the tire will be insured without placing so much weight on said drive roller as to render it difficult or impossible to manually rotate the same.

Said novel means, when taken in combination with roller 17, comprises a yielding cradle for receiving the lower portion of tire 26. Although the details of construction of said cradle may be varied, the same, as shown in the illustrated embodiment, comprises two pairs or sets of curved leaf springs, each set consisting of curved sections 50 and 51. The sections of each of said pairs are secured together at one end thereof and to an arm 52 by means of a stud bolt 53 so that the free ends of said sections curve away from one another (Fig. 3). Arms 52 are, in turn, pivotally secured to frame members 10, 10 adjacent the inner ends thereof by stud bolts 54, 54, a reduced threaded portion of said bolts being adapted to threadedly engage said frame members. Portions of arms 52 are preferably cut away, as best seen in Fig. 2, to provide for the mounting of a pair of rollers or wheels 55, 55 on the smooth, larger portions of studs 54, said rollers serving as supporting means for the inner end of frame 10—12 and the mechanism mounted thereon.

The outer ends of spring sections 50 are curled in the usual, well-known manner to provide bearings for the ends of a tie-rod or shaft 56 on the central portion of which a roller 57 is loosely mounted, said roller being adapted to engage tire 25 and to be held in yielding engagement therewith by said spring sections. Roller 57 is held against axial movement on said shaft by a pair of spacer sleeves 58, 58 and the outer ends of springs 50 are held against lateral separation by nuts 59 and washers 60 that are provided on the reduced, threaded end portions of tie-rod 56.

Any suitable means may also be provided for connecting the outer ends of spring sections 51 to each other in spaced relation and for supporting the free end of the cradle portion of the apparatus when the same is being used, said means preferably comprising a tie-rod or shaft 61 having shoulders formed thereon by reducing the diameter thereof at both ends, the reduced portions extending through openings of substantially the same diameter in vertically projecting flanges 62 formed integrally with inwardly extending arms 63 on said springs 51. Nuts 64 are employed for tightly clamping shaft 61 between flanges 62, and a sleeve 65 and a pair of rollers or wheels 66, 66 are freely mounted on said shaft for angular and rotary movement relative thereto. The latter rollers, together with rollers 55, 55 and ball 29, constitute the supporting means for the entire apparatus when the same is in use.

Means are preferably provided for operatively connecting the free ends of the spring sections 50 and 51 together and for normally maintaining the same under tension. In the illustrated embodiment, said means are constituted by a pair of flexible connectors, such as link chains 67, 67, the ends of which are operatively connected to radially extending lugs 68 and 69 formed integrally with sleeves 65 and 58, respectively.

For the purpose of avoiding any possible breakage of parts, in the event the vehicle is accidentally or otherwise lowered further than necessary, means in addition to rollers 17 and 57 are provided for absorbing the weight thereof. To this end, a pair of arms 70 (Fig. 2) are secured to or formed integrally with sleeve 65 and a cross-piece, preferably constituted by a shaft 72 which extends between the outer ends of said arms and has a roller 71 loosely mounted thereon. A leg 73 (Fig. 3) is formed on each of said arms for supporting the same in operative position on the floor. When the yielding cradle portion comprising springs 50 and 51 is folded back over frame 10—12, i. e., to inoperative position, by pivoting the same about studs 54, arms 70 and roller 71 are held in proper position relative to said springs by the tension in chains 67. As pointed out above, said chains are held in tension by the resiliency of springs 50 and 51 and thereby tend to hold lugs 68 and 69 in alignment.

In operation, car 28 is lifted by any suitable means, such as a jack (not shown), until tire 26 clears the floor or other platform a sufficient amount to permit the above-described apparatus to be slid in a lateral direction beneath the same to a position so that, upon the lowering of the car, tire 26 will engage rollers 17 and 57, in the manner shown in Figs. 1 and 3. The car is then lowered by manipulating the jack, which may be of any suitable well-known construction, until chains 67 become slack, thereby permitting sets of springs 50, 51 to yieldingly press roller 57 against the peripheral surface of tire 26. The yielding effort of said springs acting between the floor or other foundation and tire 26 serves to hold roller 57 and, hence, drive roller 17 in sufficiently firm engagement with the tire to prevent undue slippage between said drive roller and tire without putting so much weight thereon as to render it difficult to manually rotate the tire. Additionally, the forces exerted by said springs cause rollers 17 and 57 to follow irregularities in the tire and, hence, tend to hold cutting tool 30 in proper position relative to the tire for cutting an incision of the desired depth. The pressure of the spring cradle also tends to shift the entire apparatus, if necessary, into proper alignment with the plane of rotation of tire 26 and to maintain said proper alignment during operation.

After the car has been lowered to the position above described, i. e., until chains 67 become slack, cutting tool 30 is moved to the desired position for cutting an incision in the tire by manipulating cranks 42 and 49. Tool 30 may be moved both vertically and laterally into the desired position, in a manner pointed out in detail in the foregoing description. When said tool has been adjusted to the desired position, crank 25 is turned to actuate drive roller 17 and rotate the tire whereupon said tool becomes effective to cut a circumferential incision 73 therein. A series of spaced incisions may be cut in a single tire by readjusting the lateral position of knife 30 after each revolution of the tire. If desired, the tire may be rotated by the power of the vehicle engine in lieu of the manual means provided. As heretofore pointed out, this latter mode of operation has not been feasible or possible with similar devices heretofore provided. The advantages of such mode of operation are very substantial, particularly when treating large truck tires which are extremely difficult to turn by manual means.

The contour of spring sections 50 is such that the same will at all times clear a tire which is mounted adjacent to and on the same shaft as the tire being treated. It is accordingly rendered possible without any difficulty whatever to treat tires mounted on equipment employing a dual wheel construction. If the car is lowered further than necessary, the tire being treated will engage roller 71 which will then assist in supporting the weight of the car.

There is thus provided novel, simplified apparatus whereby incisions may be quickly and readily cut in the surfaces of automobile tires without the exercise of any special skill on the part of the operative and without removing the tire from the vehicle on which the same is mounted. The operation of the novel apparatus provided hereby requires a minimum of effort on the part of the operative, said apparatus being so constructed as to be substantially automatically held in the desired position relative to the tire at all times during the operation thereof. The apparatus provided is also so constructed that the tire or other article being treated may be driven either manually or by power means. Additional adjustments of the treating tool may be readily and quickly made by the operative without his getting under the vehicle at any time.

Although only a single embodiment of the invention has been illustrated and described in detail, it is to be expressly understood that the same is not limited thereto but that various changes may be made therein without departing from the spirit and scope of the invention. For example, tire 26 may be mounted on other suitable means than the axle of an automobile and means may be provided for lifting the cradle portion of the device into operative engagement with the tire in lieu of lowering the car, as above described. Also, a single set of spring sections such as springs 50 may, if desired, be employed, the springs 51 being replaced by rigid members. Various other changes, particularly changes in the design and arrangement of parts illustrated, as will now be apparent to those skilled in the art, may also be made. For a definition of the limits of the invention, reference will be had primarily to the appended claims.

What is claimed is:

1. In apparatus of the class described, a supporting frame, means rotatably mounted on said frame and adapted to engage a rotatably mounted article to be treated, two sets of springs each having diverging sections, means connecting each of said sets to said frame at the ends thereof at which said sections converge, and means for connecting the free ends of corresponding sections of each of said sets and holding the same in spaced relation, the means connecting one pair of said sections including means adapted to engage said article and be yieldingly held in engagement therewith by said springs.

2. In apparatus of the class described, a supporting frame, a roller rotatably mounted on said frame and adapted to frictionally engage a rotatably mounted tire, two sets of springs comprising sections joined together at one end and extending in diverging directions, means for securing the joined ends of said sections to said frame, means for connecting the free ends of corresponding sections of each of said sets and holding the same in spaced relation, a roller on the means connecting one pair of said sections adapted to engage said tire, means interposed between the diverging ends of said sets of springs for holding the same under stress, a cutting tool mounted on said frame, and means for moving said tool into position for cutting incisions in said tire when the latter is rotated.

3. In apparatus of the class described, a supporting frame, a roughened drive roller rotatably mounted on said frame and adapted to frictionally engage a rotatably mounted tire, means for driving said roller to rotate said tire, a pair of springs extending at substantially right angles to the axis of rotation of said drive roller, means connecting one end of each of said springs to opposite sides of said frame, means for connecting the other ends of said springs and for maintaining the same in spaced relation, said last-named means including a roller adapted to engage said tire simultaneously with said drive roller and to be yieldingly held in engagement therewith by said springs, a cutting tool mounted on said frame, and means for moving said tool into position for cutting incisions in said tire when the latter is rotated by said drive roller.

4. In apparatus of the class described, a supporting frame, a roller rotatably mounted on said frame and adapted to engage a rotatably mounted tire, a pair of springs extending at substantially right angles to the axis of rotation of said roller, means connecting one end of each of said springs to said frame, and means for connecting the other ends of said springs and maintaining the same in spaced relation, said last-named means being adapted to engage said tire simultaneously with said roller.

5. In apparatus of the class described, a supporting frame, a roller rotatably mounted on said frame and adapted to engage a tire mounted on a vehicle, a second roller adapted to engage said tire, resilient means for pressing said second roller against said tire, and means positioned between said rollers for absorbing the weight of said vehicle after said resilient means has yielded a predetermined amount.

6. In apparatus of the class described, a supporting frame, a roller rotatably mounted on said frame and adapted to engage a rotatably mounted tire, a pair of springs extending at substantially right angles to the axis of rotation of said roller, means connecting one end of each of said springs to said frame, means for connecting the other ends of said springs and maintaining the same in spaced relation, said last-named means being adapted to engage said tire simultaneously with said roller, and means for normally maintaining said springs under tension.

7. In apparatus for cutting incisions in a vehicle tire, the combination of a supporting frame, a drive roller adapted to frictionally engage the peripheral surface of said tire, means for driving said roller to rotate said tire, a second roller adapted to engage the peripheral surface of said tire, resilient means for pressing said second roller against said tire, means for operatively connecting said resilient means to said frame, a cutting tool mounted on said frame, and means for adjusting said tool relative to said frame and tire.

8. In apparatus for cutting incisions in a vehicle tire, a drive roller, means for yieldingly holding said drive roller in frictional engagement with said tire including resilient means and a roller supported by said resilient means and adapted to engage said tire, a cutting tool mounted adjacent said drive roller, and means for moving said tool into position for cutting incisions in said tire when the latter is rotated.

9. In apparatus for treating the surface of a rotatably mounted article, the combination of a plurality of rollers adapted to engage the surface of said article at different points on the periphery thereof, and connecting means interposed between said rollers, said connecting means including resilient means for yieldingly holding said rollers against said article.

10. In apparatus of the class described, supporting means, a roller rotatably mounted thereon, means for rotatably driving said roller, resilient means operatively connected to said supporting means, and a roller supported by said resilient means, said rollers being positioned to simultaneously engage an article to be treated.

11. In apparatus of the class described, supporting means, a roller rotatably mounted thereon, resilient means operatively connected to said supporting means, a roller supported by said resilient means, said rollers being positioned to simultaneously engage an article to be treated, a cutting tool mounted on said supporting means, and means for adjusting said cutting tool relative to said article whereby incisions are cut in the surface of the latter when the same is rotated.

12. In apparatus of the class described, a supporting frame, means rotatably mounted on said frame and adapted to engage a rotatably mounted article to be treated, a pair of laterally spaced, upwardly curved springs, means connecting each of said springs to said frame, and means for connecting the free ends of said springs and holding the same in spaced relation, said last-named means including means adapted to engage said article and be yieldingly held in engagement therewith by said springs.

13. Apparatus for treating tires comprising supporting means, rotatable means mounted on said supporting means and adapted to engage a rotatably mounted tire to be treated, resilient means secured to said supporting means, and means supported by said resilient means and adapted to engage said tire simultaneously with said rotatable means.

14. In apparatus of the class described, a supporting frame, rotatable means mounted on said frame and adapted to engage a rotatably mounted tire, resilient means including an elongated leaf spring secured to said frame, and means supported by said resilient means in yielding engagement with said tire simultaneously with said rotatable means.

WILLIAM F. ERRIG.
EDWARD S. DE HART.